(No Model.)
L. PAGET.
ELECTRODE FOR SECONDARY BATTERIES.
No. 397,608. Patented Feb. 12, 1889.
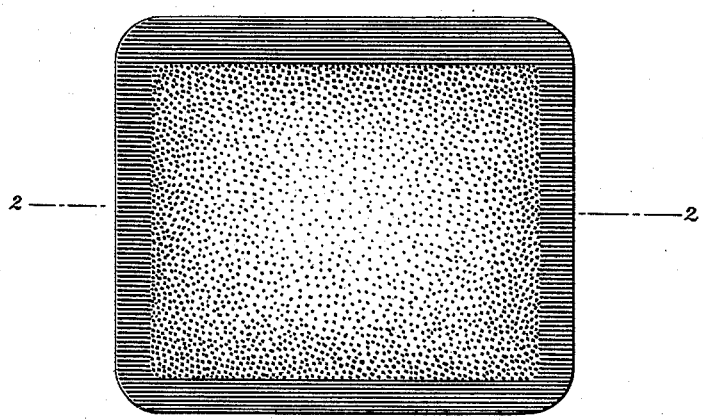

UNITED STATES PATENT OFFICE.

LEONARD PAGET, OF NEW YORK, N. Y., ASSIGNOR TO THE MACRAEON STORAGE BATTERY COMPANY, OF SAME PLACE.

ELECTRODE FOR SECONDARY BATTERIES.

SPECIFICATION forming part of Letters Patent No. 397,608, dated February 12, 1889.

Application filed November 3, 1888. Serial No. 289,893. (No model.)

*To all whom it may concern:*

Be it known that I, LEONARD PAGET, a citizen of the United States, residing in the city, county, and State of New York, have made a new and useful Invention in Secondary or Storage Batteries, of which the following is a specification.

My invention relates particularly to improvements in electrodes for use in secondary or storage batteries; and to this end it consists in a novel form of electrode in which the active material, or material adapted to become active, is so intimately united with the retaining-plate, grid-frame, or support which carries it as to be integral therewith, or, in other words, that there shall be no actual line of demarkation between the two.

Figure 1 of the drawings is a side or elevational view of my improved electrode; and Fig. 2 is a cross-sectional view of the same on line 2 2, Fig. 1. These views show the electrode as having a solid or pure metallic frame or support around the entire edge, while the interior of the electrode shades out into the active material or salt of the material from which the electrode is cast, there being no distinct line of union between the two.

In a prior application filed by me in the United States Patent Office on the 23d day of October, 1888, and bearing Serial No. 288,908, I have described and claimed the preferred process by which I construct the electrode which constitutes the subject-matter of this present application, and which process I will briefly describe here in order that my invention may be understood.

I take any well-known form of two-part mold used for casting storage-battery plates, said mold having the usual "gate" or "get," and fill those portions of the mold which ordinarily are designed to form the leaden grid, plate, or support with a pulverized reducing agent, the mold having first been heated so as not to chill the fused salt. I then place the cover on the mold and fill it with a fused salt of lead. As this fused salt is being poured into the mold the reducing agent absorbs the acid radicle of the metallic lead, more or less perfectly forming a leaden frame or support around the outer edge and elsewhere if this reducing agent has been placed in other portions of the mold, while the lead salts in a more or less pure condition fill the mold in those portions which are designed to constitute the active faces of the electrode. The action of this reducing agent is based upon the principle that it should have a greater affinity for the acid radicle of the fused salt than has lead itself when fused. As an example, if I use fused-lead oxide I may and do fill those portions of the mold designed to form the grid, plate, or support with either carbon in a fine state of division or with niter and carbon, being careful not to pack either too closely. When I use fused chloride of lead, I fill the proper portions of the mold preferably with zinc in a powdered condition, or with tin, or even magnesium, or with an alloy of zinc and magnesium, with which I have obtained very excellent results as regards fineness of casting.

By this process I produce an electrode in which the frame or support and the active material, or material adapted to become active, are merged into each other in such manner that it is not possible to note where one ends and the other begins. In consequence of this gradual shading or blending of the two materials into each other, there results an electrode which is absolutely free from those objectionable features found in that type of storage-battery electrodes in which the active material, or material adapted to become active, is mechanically applied as a paste, or by pressure, or by other well-known mechanical methods. With such electrodes the absolute disunion or disunited condition of the two materials leaves a possibility for the formation of gases between them, from which results "buckling" and "stripping" off of the active material and ultimate total disintegration. After the electrode is cast or molded, as described, it is united with other kindred electrodes and "formed" for use in the customary way. I find that with my improved electrode I am enabled to obtain marked efficiency, and that the peculiar characteristics of the electrode, as above described, give to it increased life and diminished weight in addition to the advantageous features already noted.

In a prior application for a patent filed by me in the United States Patent Office on the 8th day of August, 1888, and bearing Serial No. 282,273, I have described and claimed a novel form of electrode in which the active material, or material adapted to become active, is cast upon the grid, frame, or support, and which is therefore in a measure integral therewith; but I have found that while with such an electrode I obtain results which are of material value it is not as efficient as the electrode which constitutes the subject-matter of the present application, which I regard as a marked improvement, for the reasons indicated above.

I make no claim here to the process by which the electrode herein described is made.

Having thus described my invention, what I do claim, and desire to secure by Letters Patent of the United States, is—

1. An electrode for a secondary or storage battery, in which the active material, or material adapted to become active, and the grid, frame, or support merge into each other, substantially as described.

2. An electrode for a secondary or storage battery, in which the active material, or material adapted to become active, and the grid, frame, or support are merged into each other, the active material being held in place by the surrounding frame, substantially as described.

3. An electrode for a secondary or storage battery, in which the grid, frame, or support is of lead and the active material of a salt of lead, the two being merged into each other, so that it is not possible to distinguish any definite line of demarkation between them, substantially as described.

LEONARD PAGET.

Witnesses:
 C. J. KINTNER,
 J. F. QUINN.